United States Patent [19]
Blaize

[11] Patent Number: 5,311,741
[45] Date of Patent: May 17, 1994

[54] HYBRID ELECTRIC POWER GENERATION

[76] Inventor: Louis J. Blaize, 7138 Hillgreen Dr., Dallas, Tex. 75214

[21] Appl. No.: 959,313

[22] Filed: Oct. 9, 1992

[51] Int. Cl.[5] ............................................. F01K 13/00
[52] U.S. Cl. ..................................... 60/676; 60/641.2
[58] Field of Search ............................... 60/676, 641.2

[56] References Cited

U.S. PATENT DOCUMENTS

| | | | |
|---|---|---|---|
| 3,950,949 | 4/1976 | Martin et al. | 60/641.8 |
| 4,043,386 | 8/1977 | Franz et al. | 60/641.3 X |
| 4,342,197 | 8/1982 | Matthews | 60/641.4 |
| 4,512,156 | 4/1985 | Nagase | 60/641.2 |
| 4,542,625 | 9/1985 | Bronicki | 60/641.2 |
| 4,576,006 | 3/1986 | Yamaoka | 60/641.5 |
| 4,642,987 | 2/1987 | Csorba et al. | 60/641.2 |
| 4,712,380 | 12/1987 | Smith | 60/641.2 |
| 4,745,756 | 5/1988 | Sederquist | 60/641.2 |
| 4,866,939 | 9/1989 | Wada | 60/641.2 |
| 4,930,316 | 6/1990 | Bonham, Jr. | 60/641.5 |
| 4,967,559 | 11/1990 | Johnston | 60/641.2 |
| 4,987,568 | 1/1991 | Kalina | 60/649 |
| 5,072,783 | 12/1991 | Martinez et al. | 165/45 |
| 5,095,705 | 3/1992 | Daly | 60/641.2 |

OTHER PUBLICATIONS

J. W. Tester, D. W. Brown and R. M. Potter, "Hot Dry Rock Geothermal Energy-A New Energy Agenda for the 21st Century," Los Alamos National Laboratory (LA-11514-MS UC-251 Jul. 1989).

Primary Examiner—Stephen F. Husar
Attorney, Agent, or Firm—John W. Montgomery

[57] ABSTRACT

A new hybrid electric power production cycle is revealed, which utilizes hot, dry-rock, geothermal energy to produce dry, saturated steam, and utilizes natural gas or other fossil fuel to superheat the produced steam to a desired temperature. The superheated steam would then be used in a conventional Rankine cycle to produce large-scale electric power and energy. For a preferred steam pressure of 1800 pounds per square inch and a temperature of 1000 degrees Fahrenheit, the total energy consumed in the hybrid cycle would be 78% geothermal and 22% fossil-fuel.

2 Claims, 2 Drawing Sheets

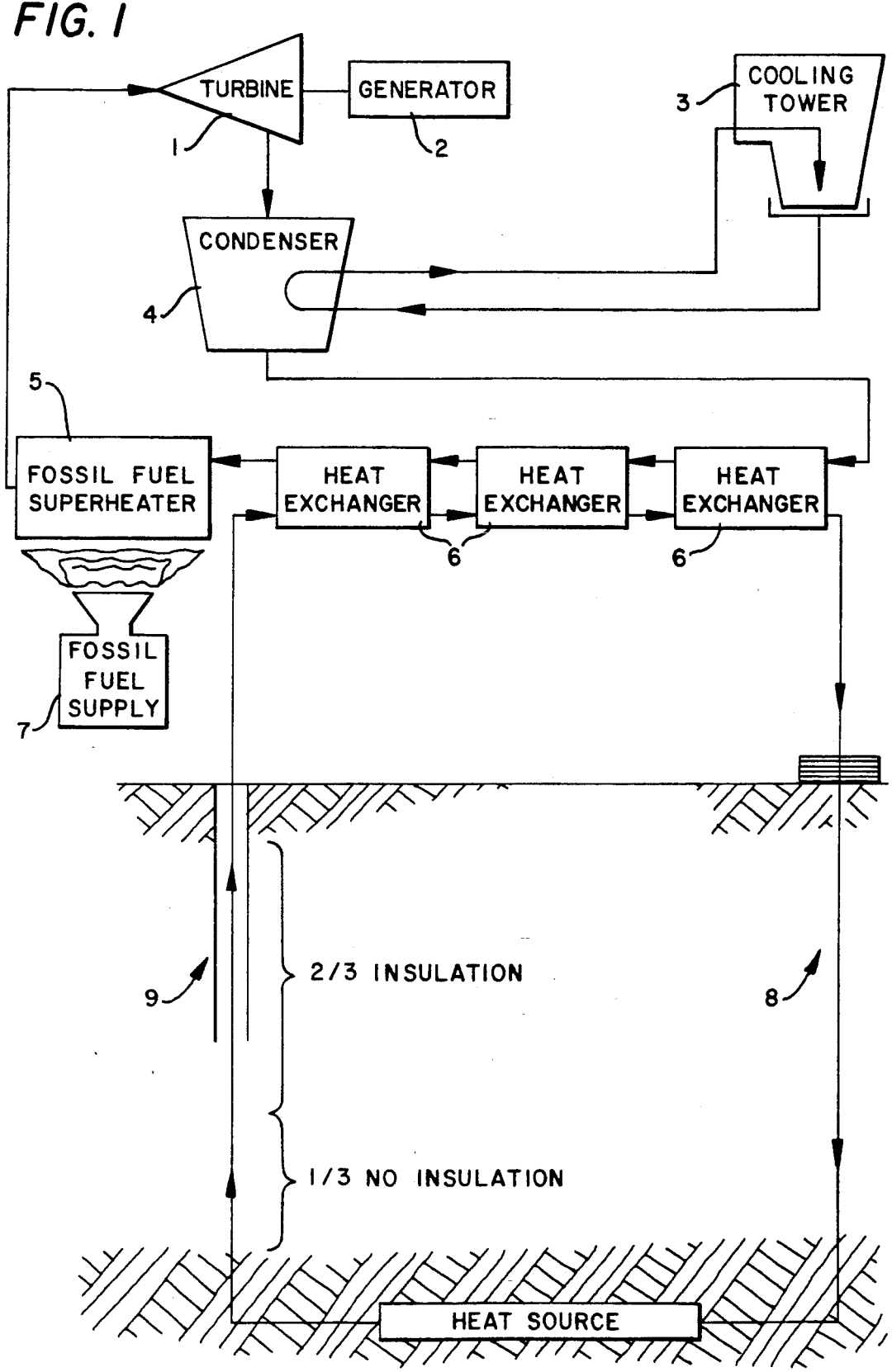

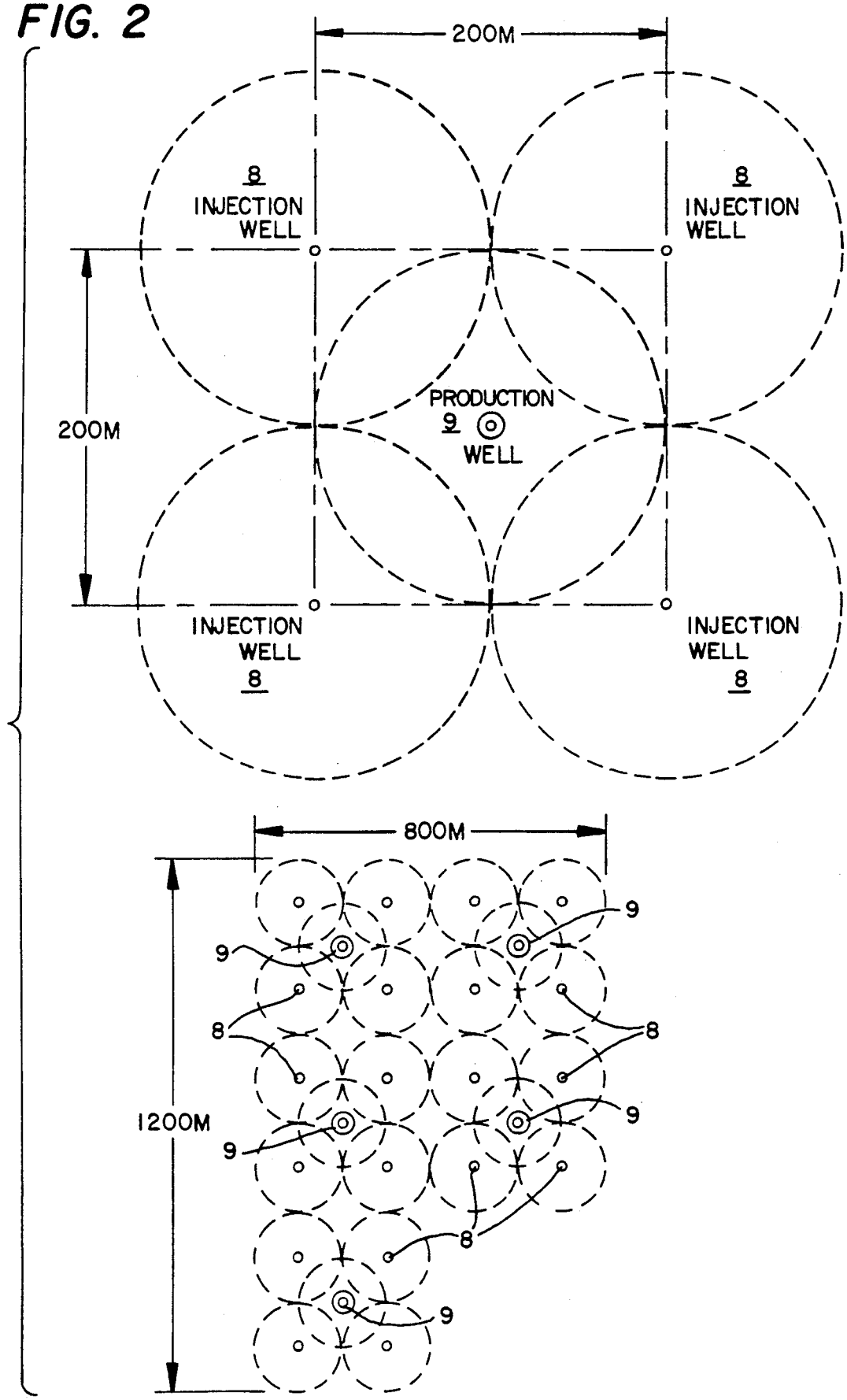

HYBRID ELECTRIC POWER GENERATION

BACKGROUND AND SUMMARY OF THE INVENTION

Over the past decade or longer, the subjects of an adequate energy supply and a cleaner environment have been discussed extensively in the technical journals and newspapers of the United States. The consensus of such discussions has been that a new, major, and clean energy source is needed in our Nation, to supplement initially and to replace ultimately its declining reserves of fossil fuels.

At current and projected rates of energy consumption, the Nation's indigenous resources of petroleum may be expected to be essentially depleted early in the Twenty-First Century and its reserves of natural gas depleted not later than a decade thereafter. It is possible, even probable, that the continued use of coal as a primary fuel for production of electrical energy will, in time, fall into disuse because of economic and environmental considerations. Provision should be made now to meet such eventuality.

Of the numerous, new energy sources that have been reported publicly, little consideration has been given to extraction and use of the vast quantity of thermal energy that is known to be contained in hot, dry rock of the Earth's crust. Interest in geothermal energy has focused primarily on extraction and use of thermal energy contained in naturally occurring reservoirs of pressurized hot water or steam that exist in Northern California and at other widely scattered locations throughout the World. Generally, such naturally occurring thermal reservoirs, while important, are of relatively small capacity and uncertain life and represent only a very small fraction of accessible energy contained in hot, dry rock of the Earth's crust.

Approaches to utilization of the energy of hot, dry rock appear in U.S. Pat. Nos. 4,712,380; 4,642,987; 4,745,756; and 4,512,156. For example, U.S. Pat. No. 4,712,380 discloses heating a first working fluid by injection into a well extending down into hot, dry rock and recovery of the heated working fluid from a second adjacent well, and then using the heated working fluid to heat a more volatile second working fluid which, in turn, drives a turbine.

The total accessible quantity of such hot, dry-rock geothermal energy underlying the Continental United States has been estimated by several investigators to be between 10 million and 13 million quads. (A quad is equal to $10^{15}$ Btu, or to the chemical energy contained in 181.8 million barrels of petroleum.) If as much as 1% of such energy were extracted and used, the amount would be more than sufficient to supply the Nation's electric-energy requirements for the next 200 years, assuming a doubling of energy use every 50 years.

In addition to its value as a major energy source for utilization temperatures at or below 350° C. (662° F.), geothermal energy derived from hot, dry-rock within the Earth's crust, can be used in a hybrid thermal cycle, with natural gas, ethanol, or other clean-burning fuel, for large scale production of electric power and energy, with a minimal emission to the atmosphere of products of combustion. In such a hybrid cycle, sensible and latent heat required to produce dry, saturated steam at a relatively high pressure, would be supplied from a geothermal source. The dry, saturated steam would then be superheated, to a desired temperature, by heat derived from combustion of a fossil fuel, natural gas, or a clean burning chemical fuel. For steam conditions of 1800 pounds per square inch pressure and 1000° F. temperature, 78% of the required heat energy would be supplied from a geothermal source and 22% from a fossil fuel source.

The hybrid cycle would yield two other important benefits:

(1) It would assure an exact match between turbine design temperature and actual temperature of available geothermally-produced steam, and
(2) It would provide a means to correct a reasonable decline in steam temperature, over passage of time, if the geothermal energy source were not fully renewable.

BRIEF DESCRIPTION OF THE DRAWINGS

The present invention will be described with reference to the accompanying drawings, which are schematic for simplicity.

FIG. 1 is a schematic diagram for a preferred embodiment hybrid electric power generation plant; and FIG. 2 is a plan view of a five-well geothermal energy absorption module; also shown is a preferred configuration of such geothermal modules to supply steam requirements of a 250 Mw generating unit or plant.

DESCRIPTION OF THE PREFERRED EMBODIMENTS

FIG. 1 shows the flow of working fluids in a preferred embodiment electric power generation plant. In particular, hot geothermal brine is recovered from production well 9 and passed through an array of counter-flow heat-exchangers 6 for production of high-quality, dry, saturated steam. The steam is then superheated in superheater 5 to a desired temperature by combustion of natural gas or other clean-burning fuel 7. The superheated steam is then used in a conventional Rankine cycle with turbine 1 which drives electric power generator 2 for large-scale production of electric power and energy. The steam is then cooled and liquified in condenser 4 aided by cooling tower 3 and returned to heat exchangers 6 to complete the steam cycle. The heat-source brine, after passing through the heat exchangers 6, is then reinjected through injection well 8 into the geothermal heat source for reuse, along with any non-condensable gases and dissolved solids. Propagation of the brine through the hot-dry rock heat source to the production well 9 completes the brine cycle. The upper two-thirds or more of the production well 9 is insulated. The plant thus absorbs energy from the hot, dry rock to produce dry, saturated steam to be superheated by fossil fuel combustion to adjust the steam temperature to that required by the turbine. Such a hybrid cycle permits the use of geothermal energy in a high efficiency electric power generation plant.

A description follows of important components and design considerations relating to development of a hybrid, geothermal-electric plant of 250 Mw net capability. Selection of such capability is not intended to imply that a unit or plant of greater or lesser capability would not be practicable or desirable.

At present levels of technology, the primary use of a hybrid thermal cycle would be for large-scale production of electric power and energy. It would be compatible, in all important respects, with existing electric production facilities and would permit a readily achievable transition to a new thermal-energy-based system to serve the Nation's electrical energy needs for an indefinitely long period of time. It would achieve all of the desirable features of a nuclear cycle without the possible occurrence of a nuclear incident and problems relating to disposal of nuclear waste.

Hot, dry-rock, geothermal energy can be extracted from the Earth's crust at practically any location in the World. However, geologic conditions, in the United States, are generally more favorable in the western half of the Nation, than in the eastern half. In the western half, a desired geothermal temperature generally can be reached at a lesser depth of penetration of the crust, and therefore at a lower cost. For optimum mid-continent conditions, having an average temperature gradient of 50° C. (122° F.) per kilometer of crust penetration, a temperature of 350° C. (662° F.) can be reached at a depth of 7 km (23,000 ft.). Such temperature is presently considered to be the maximum temperature that can be obtained at the existing level of well-drilling technology.

To obtain a steam temperature higher than 662° F., a hybrid cycle is considered necessary. In the preferred embodiment hybrid cycle, pressurized geothermal brine is brought to the Earth's surface and circulated in an array of counter-flow heat exchangers to produce dry, saturated steam at 1800 pounds per square inch pressure and 662° F. temperature. A fossil-fueled superheated is then used to raise the temperature of the geothermally produced dry, saturated steam to 1000° F. Thus, high-quality turbine steam, at conditions of 1800 pounds per square inch pressure and 1000° F. temperature, is made available for large-scale production of electric power and energy. For steam conditions of 1800 pounds per square inch pressure and 1000° F. temperature, 78% of the required heat energy would be supplied from a geothermal source and 22% from a fossil fuel source.

FIG. 2 reveals principal details of a five-well energy absorption module, consisting of four injection wells uniformly spaced around a larger production well with a distance of 200 meters between the injection wells. Also shown is a preferred configuration of such geothermal modules to supply steam requirements of a 250 Mw generating unit or plant.

An estimate follows of the capital and production costs of a 250 Mw, single unit, geothermal-electric plant.

| Estimated Cost of Electrical Energy Derived From A 250 Mw Hybrid Power Plant In Terms of 1992 Dollars | |
|---|---:|
| (a) Cost of Geothermal Wells | $150,000,000 |
| (b) Cost of Electrical Production Plant | 175,000,000 |
| (c) Cost of (a) plus (b) | 325,000,000 |
| (d) Annual Cost of (c) at 15% | 48,750,000 |
| (e) Annual Cost of Fossil Fuel | 7,000,000 |
| (f) Annual Cost of Oper. & Maint. | 5,000,000 |
| (g) Total Annual Cost | 60,750,000 |
| (h) Annual Energy Production - Kwh | 1,750,000,000 |
| (i) Total Cost of Energy - Cents/Kwh | 3.46 |

While descriptions of components of the preferred embodiment hybrid cycle are specific in numerous respects, it is to be recognized that variations in details are inevitable and subordinate to the basic concept of a cycle that is frugal in use of a clean-burning fuel that is becoming less plentiful, and generous in use of an energy source that exists abundantly in hot, dry rock of the Earth's crust, The hybrid cycle has the following advantages and features:

(1) The hybrid cycle, whose heat source is predominantly geothermal, will make possible large-scale and efficient production of electric power and energy for an indefinitely long period of time.
(2) The hybrid cycle can become the nucleus of a National Energy Strategy that is urgently needed in our Nation.
(3) The hybrid cycle will increase the output and efficiency of a conventional, single component, geothermal cycle, by superheating dry, saturated, geothermally produced steam to a desired final temperature.
(4) The hybrid cycle will effectively optimize the value of reserves of natural gas or other clean burning fossil fuels, by using such fuels in a most efficient manner.
(5) With appropriate credit for cleanliness and quantity of stack emissions, the hybrid cycle is cheaper than any known alternative.
(6) The hybrid cycle will permit close control of temperature of geothermally produced steam by adjustment of the input of fossil fuel energy.
(7) The hybrid cycle will make possible installation of large and efficient electric power production units using geothermal energy.
(8) The hybrid cycle is fully compatible with existing electric power production facilities and will permit replacement of existing steam generators (boilers) because of their physical condition or lack of an adequate fuel supply.

What is claimed is:

1. A method of electric power generation using a total amount of heat energy, comprising the steps of:
   (a) heating and completely evaporating water to produce dry, saturated steam at a first high temperature and first high pressure with geothermal heat energy from a high temperature geothermal heat source, which geothermal heat energy is more than about seventy percent (70%) of all of said total heat energy used in said method of electric power generation, said high pressure sufficient for effective use in a large scale electric power turbine generator, said energy from said high temperature geothermal heat source is derived from injecting brine from a selected earth surface location into high temperature hot, dry rock for absorbing said heat energy therefrom and returning said brine to said earth surface location and passing it through a counterflow heat exchanger to completely evaporate said water to produce said dry saturated steam at said first high temperature and pressure;
   (b) then superheating said dry saturated steam to produce steam at a second high temperature and at said first high pressure using an amount of heat energy which is less than about 30% of said total amount of heat energy; and
   (c) then applying said superheated steam at said high pressure to drive a large scale electric power turbine generator.

2. The method of claim 1, wherein:
   (a) said first high temperature is about 350° C. (about 660° F.); and
   (b) said high pressure is about 1800 psi; and
   (c) said second high temperature is about 540° C. (about 1000° F.) so that said heat energy from said geothermal high temperature heat source provides more than about 70% of all heat energy used in said method of electric power generation.

* * * * *